US006878054B2

United States Patent
Klesing et al.

(10) Patent No.: US 6,878,054 B2
(45) Date of Patent: Apr. 12, 2005

(54) VENTILATION CAP FOR A MOTOR VEHICLE ROOF

(75) Inventors: Joachim Klesing, Eichman (DE); Michael Kölbl, Neuried (DE); Martin Pollak, Puchheim (DE); Bernd Schleicher, Munich (DE); Wolfgang Seifert, Germering (DE); Helmut Teschner, Landsberg (DE); Bernhard Vecchioni, Oxford, MI (US)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/336,034

(22) Filed: Jan. 3, 2003

(65) Prior Publication Data

US 2003/0162490 A1 Aug. 28, 2003

(30) Foreign Application Priority Data

Jan. 4, 2002 (DE) .......................................... 102 00 164

(51) Int. Cl.$^7$ ................................................ B60H 1/24
(52) U.S. Cl. ........................ 454/129; 454/138; 454/142; 454/158
(58) Field of Search ................................ 454/129, 136, 454/137, 138, 141, 142, 158

(56) References Cited

U.S. PATENT DOCUMENTS

| 1,778,546 | A | * | 10/1930 | Bode ........................... 454/138 |
| 2,087,651 | A | * | 7/1937 | Mygland ...................... 454/138 |
| 2,125,486 | A | * | 8/1938 | Christman ................... 454/138 |
| 2,145,452 | A | * | 1/1939 | Miller et al. ................. 454/138 |
| 2,153,147 | A | * | 4/1939 | Lintern ........................ 454/138 |
| 2,172,939 | A | * | 9/1939 | Lintern et al. .............. 454/138 |
| 2,523,104 | A | * | 9/1950 | Emmert ....................... 454/138 |
| 2,652,763 | A | | 9/1953 | Emery et al. |
| 2,758,533 | A | * | 8/1956 | Hill et al. .................... 454/138 |
| 2,987,980 | A | * | 6/1961 | Winn .......................... 454/138 |
| 3,299,794 | A | | 1/1967 | de Coye de Casselet |
| 4,193,339 | A | * | 3/1980 | Giles .......................... 454/136 |
| 4,730,552 | A | | 3/1988 | Murray |
| 5,344,361 | A | * | 9/1994 | Matthias ..................... 454/129 |
| 5,544,929 | A | * | 8/1996 | Nagai ......................... 362/492 |
| 6,062,975 | A | * | 5/2000 | Knudtson ................... 454/138 |

FOREIGN PATENT DOCUMENTS

| CH | 383 800 A | 10/1964 | |
| DE | 1 680 846 | 4/1971 | |
| DE | 34 11 053 | * 10/1985 | ................. 454/137 |
| FR | 1 350 830 A | 1/1964 | |

* cited by examiner

Primary Examiner—Harold Joyce
(74) Attorney, Agent, or Firm—Nixon Peabody LLP; David S. Safran

(57) ABSTRACT

A ventilation cap (3) for a motor vehicle roof (1) for ventilation of the motor vehicle interior (4) and a roof with such a ventilation cap, in which the ventilation cap (3) is formed to be oblong having an air duct with a front air opening (6) and with a rear air opening (7) which discharge above the motor vehicle roof (1), the air duct being flow-connected to the motor vehicle interior (4) via a flow path which is formed in the ventilation cap (3). The motor vehicle roof (1) is formed preferably as a glass roof with at least two glass surfaces (2a, 2b), on which the ventilation cap (3) is mounted essentially a central longitudinal axis.

24 Claims, 2 Drawing Sheets

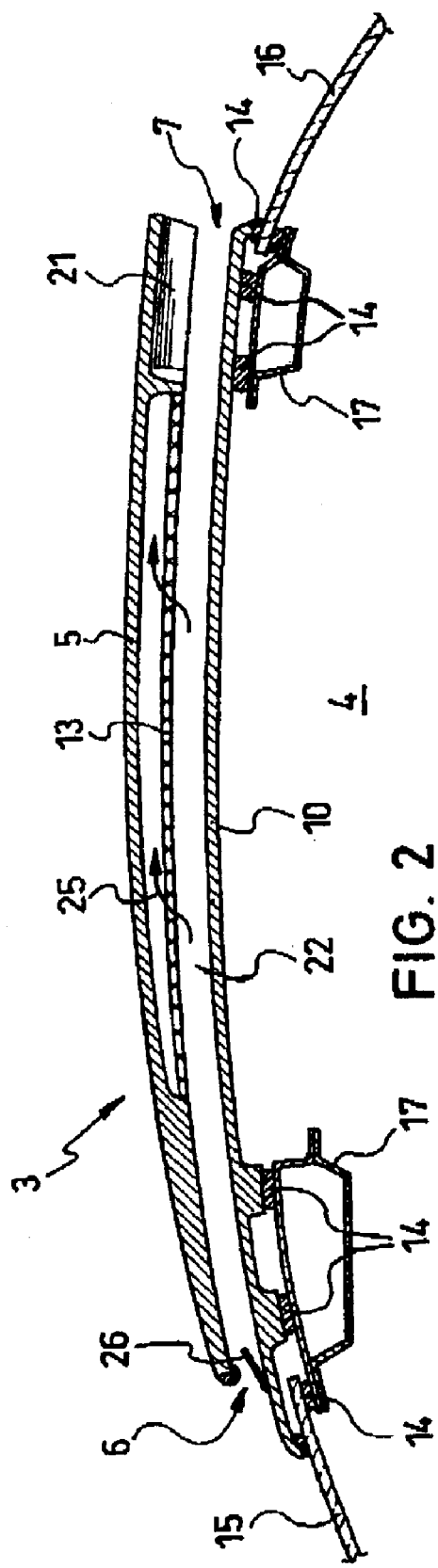
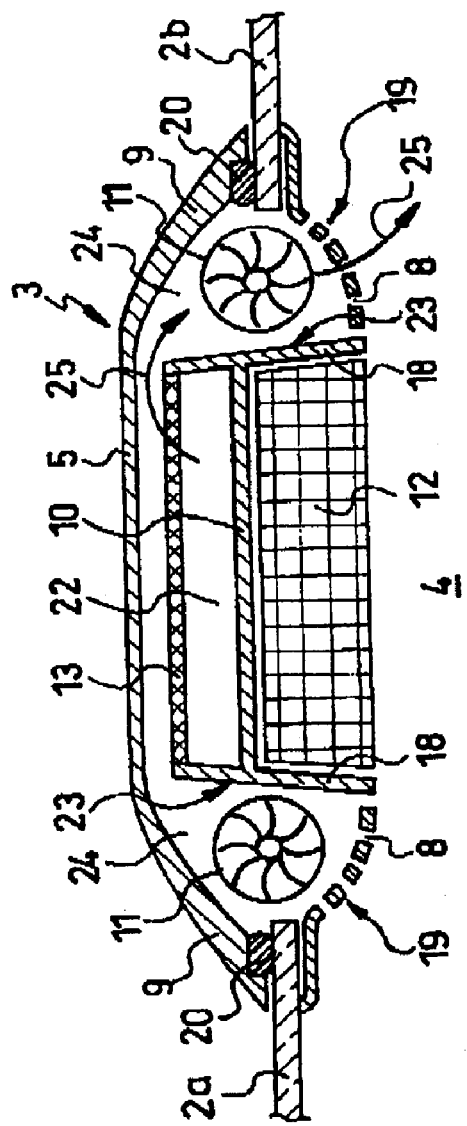

VENTILATION CAP FOR A MOTOR VEHICLE ROOF

BACKGROUND OF THE INVENTION

1. Field of the Invention

The invention relates to a ventilation cap for a motor vehicle roof for ventilation of the motor vehicle interior, a motor vehicle roof with such a ventilation cap, and a roof module with one such ventilation cap for a motor vehicle roof.

2. Description of Related Art

Published German Patent Application DE 1 455 860 A1 and its corresponding U.S. Pat. No. 3,299,794 disclose a ventilation means in the roof of a motor vehicle which has a sleeve which is located in the roof opening to be able to pivot in a housing, and which can be swung on the roof in the direction of travel and opposite the direction of travel, by which either air is forced into the motor vehicle interior, or is sucked out of the interior of the motor vehicle by a resulting underpressure.

Published German Patent Application DE 1 680 846 B1 discloses a Peltier element cooling arrangement for motor vehicles which is mounted on a motor vehicle roof which is made doubled-shelled, there being at least one fan for transport of the air to be cooled into the interior of the motor vehicle.

U.S. Pat. No. 5,344,361 describes a portable auxiliary fan unit which can be mounted in the sun roof of a motor vehicle, so that the installed fan can suck Warm air out of the vehicle interior.

SUMMARY OF THE INVENTION

A primary object of the present invention is to provide a ventilation cap of the initially mentioned type with improved serviceability, and to provide a motor vehicle roof with such a ventilation cap as well as a roof module with such a ventilation cap for a motor vehicle roof.

This object is achieved in accordance with the invention in that the ventilation cap is formed to be oblong and has an air duct with a front air opening and with a rear air opening which intake/discharge above the motor vehicle roof. Furthermore, the air duct is flow-connected to the motor vehicle interior via a flow path which is formed in the ventilation cap. While driving, a continuous air flow forms in the air duct and is routed at least partially via the flow path into the motor vehicle interior. The air duct is covered to the outside and is accessible only through the front air opening(s) and the rear air opening(s). Such a ventilation cap can be mounted on the motor vehicle roof as a retrofit unit by forming a corresponding mounting opening on the motor vehicle roof.

The ventilation cap preferably has an upper cover which has at least one front air opening and at least one rear air opening and covers the air duct, and in the motor vehicle interior, there are air openings for delivery or discharge of air via the flow path.

Preferably, the ventilation cap contains an air filter in the flow path between the air duct and the motor vehicle interior in order to keep unwanted foreign bodies, such as, for example, dirt particles, pollen, etc., out of the motor vehicle interior. This arrangement routes only the air which is flowing into the motor vehicle interior and which has been branched off from the air duct through the air filter, while the air flow in the air duct is not hindered. Larger particles of dirt thus flow straight through the air duct and thus do not clog the air filter. The air filter can form for example a section of one side of the air duct, especially the top, or can be attached to the lattice structure which forms this side.

Advantageously, the ventilation cap is integrated into the motor vehicle roof and forms a unit which is made structural and formal with the motor vehicle roof.

In another advantageous embodiment, the air openings of the ventilation cap can be closed or their cross-sectional area can be adjusted. Thus, the air flow which forms in the ventilation cap can be regulated and can be adapted to the requirements of the user. In this connection, there can also be electrical or electronic adjustment or closing of the air openings, by which the air openings are dimensioned accordingly via a control device depending on given parameters (for example, outside temperature, driving speed, etc.). As a result, the air flow which forms in the ventilation cap can be matched, for example, to the vehicle driving speed so that as the driving speed rises and falls, to achieve an essentially constant air flow, the cross-sectional area of the air openings can be made smaller or larger. This can take place automatically or manually by the user.

Advantageously, the cover of the ventilation cap is connected to the motor vehicle roof on its longitudinal sides, forming a seal, in order to achieve an eddy-free air flow between the front and rear air openings.

The ventilation cap, in another advantageous embodiment, has an air duct bottom under the cover which is used as the boundary surface for the air flow which forms in the ventilation cap. This air duct bottom can have a cross section which has an H shape, at least in areas, so that the air flow in it can be channeled.

According to another advantageous embodiment, the ventilation cap can have at least one fan in order to intensify the air flow in the ventilation cap, even when the motor vehicle is stationary and in addition when the motor vehicle is moving. Such a fan can be made, for example, as a radial fan.

In order to regulate the air flow which is routed into the motor vehicle interior, the air openings of the ventilation cap can be adjustable. Furthermore, the ventilation cap can have a useful area which is accessible from the motor vehicle interior, for example a recess in the bottom of the air duct in which components, such as stowage compartments, visual displays, speakers, etc. can be mounted.

For retrofitting or for separate preproduction, the ventilation cap for the motor vehicle roof can also be designed and produced as its own unit. In this way, existing motor vehicle roofs which have been made, for example, as a glass roof can be retrofitted, or a prefabricated ventilation cap can be inserted into a corresponding opening of the motor vehicle roof in the installation of the described motor vehicle roof.

The object is also achieved by a motor vehicle roof with a ventilation cap in which the oblong ventilation cap is mounted on the motor vehicle roof essentially in the middle, extending in the lengthwise direction of the roof. For improved air feed and through-flow of air to or through the ventilation cap it is feasibly provided that the ventilation cap on the motor vehicle roof extends essentially from the front window to the rear window. Preferably, the motor vehicle roof is formed as a glass roof with at least two glass surfaces, between which the ventilation cap is located.

The ventilation cap makes it possible to provide a motor vehicle roof made as a glass roof with a ventilation system, and thus, to counteract the heating of the motor vehicle interior which occurs as a result of the transparency in the glass roof by delivering or removing air through the ventilation cap. There results a transparent motor vehicle roof with a temperature-controllable motor vehicle interior.

Likewise, for retrofitting or for prefabrication, a roof module in accordance with the invention can be provided with a ventilation cap for a motor vehicle roof according to the invention. This roof module can comprise, in addition to the ventilation cap, also parts of a glass roof or the entire glass roof. Such a roof module is also inserted into the corresponding recess of the motor vehicle roof during installation or retrofitting.

One embodiment of the motor vehicle roof is explained in detail below with reference to the accompanying drawings.

SUMMARY OF THE INVENTION

FIG. 2 is a lengthwise section taken along section line A—A in FIG. 1; and

FIG. 3 is a transverse taken along section line B—B in FIG. 1.

DETAILED DESCRIPTION OF THE INVENTION

Figure 1:
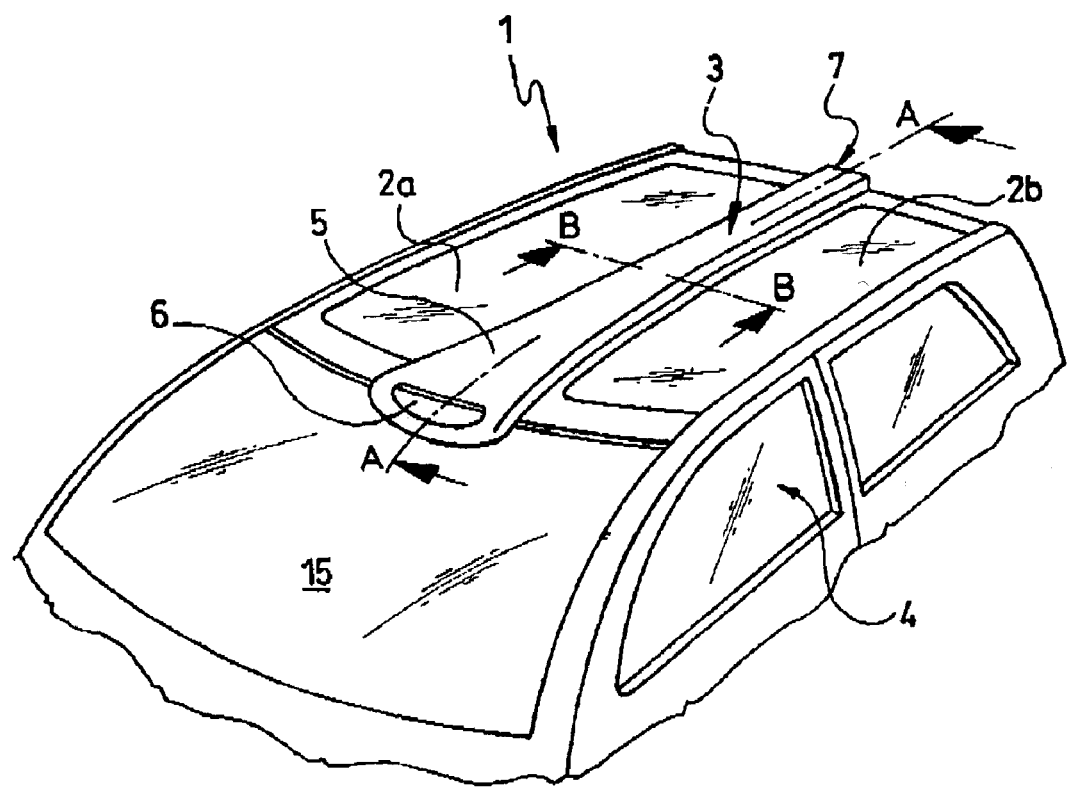
FIG. 1 is a schematic perspective view of the top portion of a motor vehicle with a ventilation cap in accordance the invention on the motor vehicle roof.

FIG. 1 shows a partial view of a motor vehicle with a motor vehicle roof 1 which is formed as a glass roof with a right glass surface 2a and a left glass surface 2b. An oblong ventilation cap 3 is mounted essentially in the middle between the two glass surfaces 2a, 2b and contains a cover 5 under which an air duct 22 which penetrates the ventilation cap 3 and runs in the lengthwise direction (see FIG. 2). The cover 5 contains a front air opening 6 and a rear air opening 7 for the air duct 22. While driving, an air flow enters via the front air opening 6 and flows through the air duct 22.

The air duct bottom 10 of the ventilation cap 3 forms the bottom of the air duct 22. The bottom 10 of the air duct is connected in a sealed, via seals 14 which are shown schematically, to vehicle parts, for example, the front window 15, the rear window 16 and the front and rear cross roof members or transverse bows 17 of the motor vehicle. Furthermore, the air duct 22 is bordered on either side by side walls 23. The top of the air duct 22 is formed in the front section by the cover 5 and in the following section by an air filter 13. The air filter 13 is located spaced apart from the cover 5 which extends over it so that the air flowing through the air duct 22 can flow through the air filter 13 into the two lateral cavities 24 next to the air duct 22 and from there can reach the motor vehicle interior 4 via vent openings 8 (for example, the flow path is shown schematically by arrows 25), by which the internal climate of the motor vehicle interior 4 can be changed and regulated. Coarse particles of dirt such as, for example, insects can thus flow through the air duct 22 unhindered, while the air which ventilates the interior 4 is cleaned by the air filter 13. Since the air filter 13 is thus essentially not in the immediate flow path of the coarse dirt particles, it will foul less rapidly.

The flow-through cross section of each of the two air openings 6, 7 can be adjusted independently of one another by, for example, by flaps 26 or the like (a flap 26 is shown schematically only on the front air opening 6). By adjusting the degree of opening of the air openings 6, 7, the air flow passing through the ventilation cap 3 can be reduced from a maximum value to zero. Furthermore, the ventilation cap 3 can be operated variably, the air openings 6, 7 being either opened or closed individually. If, for example, the front air opening 6 is completely opened and the rear air opening 7 is closed, the entire air flow in the air duct 22 is necessarily routed through the air filter 13 into the motor vehicle interior 4.

In the area of the rear air opening 7, a light element 21, such as, for example, a brake light, can be integrated into the ventilation cap 3, for example, in its cover 5.

The air duct bottom 10 together with the side parts 23 can have an essentially H-shaped cross section (see FIG. 3), in the top area of the H-shaped cross section as a cover of the air duct 22 there being an air filter 13 (for example, a conventional fabric filter) and in the lower H-shaped area there being the useful area 12 of the ventilation cap 3 for attaching components such as stowage compartments, visual displays, speakers and the like. The lower sections 18 of the side walls 23 of the air duct bottom 10 with the H-shaped cross section are tightly joined to the glass surfaces 2a, 2b. The connecting areas 19, for example, an inner lining, having ventilation openings 8 through which the air can flow into the motor vehicle interior 4 or out of it. The cross section of the air openings 8 can be adjustable (for example, by flaps), so that the air flow delivered to the motor vehicle interior 4 can be regulated in this way.

The longitudinally extending sides 9 of the cover 5 are tightly connected to the glass surfaces 2a, 2b of the motor vehicle roof 1 via seals 20.

Regardless of any air flow that may be produced in the air duct 22 by driving of the motor vehicle, an air flow can be produced by blowers or fans 11 which can be located in the cavities 24 between the connecting areas 19 and the cover 5 of the ventilation cap 3. The fans 11 can also be operated with the vehicle stationary and can be operated for blowing in air and/or for exhausting air.

The ventilation cap 3 can be made divisible so that the air filter 13 is easily accessible and interchangeable.

What is claimed is:

1. Ventilation cap for a motor vehicle roof, comprising:
an oblong cap, having an air duct with a front air inlet opening, a rear air outlet opening and an air permeable side between said inlet and outlet openings, which is adapted for mounting above the roof of a motor vehicle roof,
wherein said air duct is unobstructed between said inlet and outlet openings, and
wherein the air duct communicates, via an air permeable side of the air duct, with a flow path for directing at least a portion of a flow of air between said openings into an interior space of the motor vehicle interior, said flow path comprising at least one lateral cavity at a lateral side of the air duct.

2. Ventilation cap for a motor vehicle roof, comprising:
an oblong cap, having an air duct with a front air inlet opening, a rear air outlet opening and an air permeable side between said inlet and outlet openings, which is adapted for mounting above the roof of a motor vehicle roof,
wherein said air duct is unobstructed between said inlet and outlet openings,
wherein the air duct communicates, via an air permeable side of the air duct, with a flow path for directing at least a portion of a flow of air between said openings into an interior space of the motor vehicle interior, and
wherein said air permeable side of the air duct comprises an air filter is disposed in said flow path and is a top side of said air duct.

3. Ventilation cap as claimed in claim 1, further comprising means for adjusting the size of the flow cross section of the at least one of the front air inlet opening and the rear air outlet opening.

4. Ventilation cap as claimed in claim 3, wherein the means for adjusting are electrically or electronically operable.

5. Ventilation cap as claimed in claim 1, further comprising a cover with seals extending along lengthwise sides thereof for sealingly connecting the cap at an edge area of an opening of the vehicle roof in an installed state integrated within the opening of the vehicle roof.

6. Ventilation cap as claimed in claim 5, wherein an air duct bottom is provided under the cover.

7. Ventilation cap as claimed in claim 1, further comprising at least one fan for producing an air flow in the flow path.

8. Ventilation cap as claimed in claim 1, wherein the flow path comprises ventilation openings on a bottom of the cap for directing air into said interior space.

9. Ventilation cap as claimed in claim 1, wherein the cap has at least one useful area which is accessible from the vehicle interior for receiving ancillary items.

10. Ventilation cap as claimed in claim 9, wherein said at least one useful area is located under an air duct bottom element which has, at least in part, an H-shaped cross section.

11. Ventilation cap as claimed in claim 2, further comprising means for adjusting the size of the flow cross section of the at least one of the front air inlet opening and the rear air outlet opening.

12. Ventilation cap as claimed in claim 11, wherein the means for adjusting are electrically or electronically operable.

13. Ventilation cap as claimed in claim 2, wherein an air duct bottom is provided under the cover; wherein the air duct bottom together with side walls of the air duct form a structure having an H-shaped cross section at least in areas; and wherein the flow path comprises ventilation openings at opposite sides of said structure for directing air, which has passed through said filter and around the exterior of said duct, into said interior space.

14. Ventilation cap as claimed in claim 13, wherein the cap has at least one useful area which is accessible from the vehicle interior for receiving ancillary items.

15. Ventilation cap as claimed in claim 14, wherein said at least one useful area is located under said air duct bottom between the side walls of the air duct.

16. Motor vehicle roof as claimed in claim 11, wherein the roof structure is a glass roof with at least two glass surfaces, between which the cap is located.

17. Ventilation cap for a motor vehicle roof, comprising:
an oblong cap, having an air duct with a front air inlet opening, a rear air outlet opening and an air permeable side between said inlet and outlet openings, which is adapted for mounting above the roof of a motor vehicle roof,
wherein said air duct is unobstructed between said inlet and outlet openings,
wherein the air duct communicates, via an air permeable side of the air duct, with a flow path for directing at least a portion of a flow of air between said openings into an interior space of the motor vehicle interior, and
wherein the air duct bottom together with side walls of the air duct form a structure having an H-shaped cross section at least in areas.

18. Motor vehicle roof, comprising:
a vehicle roof structure; and
an oblong cap, having an air duct with a front air inlet opening, a rear air outlet opening and an air permeable side between said inlet and outlet openings,
wherein said air duct is unobstructed between said inlet and outlet openings,
wherein the air duct is provided with a flow path through an air permeable side thereof for directing at least a portion of a flow of air between said openings below said roof structure into an interior space of the motor vehicle interior, said flow path comprising at least one lateral cavity at a lateral side of the air duct; and
wherein the oblong cap is mounted on the vehicle roof structure extending essentially along a central longitudinal axis of the roof structure.

19. Motor vehicle roof as claimed in claim 18, wherein the cap extends essentially from the front window header area of the roof structure to a rear window header area of the roof structure.

20. Motor vehicle roof as claimed in claim 18, wherein said air permeable side of the air duct comprises an air filter is disposed in said flow path and is a top side of said air duct.

21. Motor vehicle roof as claimed in claim 18, wherein the cap has at least one useful area which is accessible from the vehicle interior for receiving ancillary items.

22. Motor vehicle roof as claimed in claim 18, wherein the oblong cap has a cover with seals extending along lengthwise sides thereof which sealingly connect the cap to the vehicle roof structure at an edge area of an opening of the vehicle roof structure within which the cap is integrated.

23. Motor vehicle roof, comprising:
a vehicle roof structure; and
an oblong cap, having an air duct with a front air inlet opening, a rear air outlet opening and an air permeable side between said inlet and outlet openings,
wherein said air duct is unobstructed between said inlet and outlet openings,
wherein the air duct is provided with a flow path through an air permeable side thereof for directing at least a portion of a flow of air between said openings below said roof structure into an interior space of the motor vehicle interior; and
wherein the oblong cap is mounted on the vehicle roof structure extending essentially along a central longitudinal axis of the roof structure
wherein an air duct bottom is provided under the cover; wherein the air duct bottom together with side walls of the air duct form a structure having an H-shaped cross section at least in areas; and wherein the flow path comprises ventilation openings at opposite sides of said structure for directing air, which has passed through said air permeable side and around the exterior of said duct, into said interior space.

24. Ventilation cap as claimed in claim 23, wherein said cap has at least one useful area which is accessible from the vehicle interior for receiving ancillary items is located under said air duct bottom between the side walls of the air duct.

* * * * *